US006251561B1

(12) United States Patent
Kawai et al.

(10) Patent No.: US 6,251,561 B1
(45) Date of Patent: Jun. 26, 2001

(54) OPTICAL INFORMATION RECORDING MEDIUM AND MANUFACTURING METHOD THEREOF

(75) Inventors: Shoichi Kawai, Kuwana; Hironari Kuno, Kariya; Naoki Sano, Obu; Ryoichi Sugawara, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/234,983

(22) Filed: Jan. 22, 1999

(30) Foreign Application Priority Data

Jan. 23, 1998 (JP) .................................................. 10-011485
Jun. 11, 1998 (JP) .................................................. 10-163885

(51) Int. Cl.[7] ................................ G11B 7/24; G11B 7/26
(52) U.S. Cl. ............................... 430/270.11; 430/270.12; 430/945; 428/64.4; 204/192.26
(58) Field of Search ..................... 430/270.11, 270.12, 430/945; 428/64.4; 204/192.26

(56) References Cited

U.S. PATENT DOCUMENTS 4,647,947  3/1987  Takeoka et al. .
4,702,991  10/1987  Takeoka et al. .
4,883,741  11/1989  Takahashi et al. .
4,940,618  7/1990  Hamada et al. .
5,090,009  2/1992  Hamada et al. .

FOREIGN PATENT DOCUMENTS 58-009231  1/1983  (JP) .
61-178745  8/1986  (JP) .

OTHER PUBLICATIONS

English Language Abstract of JP 58–009231, Jan. 1983.*

* cited by examiner

Primary Examiner—John A. McPherson
(74) Attorney, Agent, or Firm—Pillsbury Winthrop LLP (57) ABSTRACT

A recording film is formed by a vacuum film formation process. The recording film contains a substance which is thermally decomposed when a recording laser beam is irradiated thereto. When the substance is thermally decomposed by irradiation of the recording laser beam, a substance generated by the thermal decomposition is precipitated within the recording film, and therefore a change in complex index of refraction is caused predominantly over the raising deformation in the recording film. As a result, information is recorded in the recording film while causing almost no raising deformation of the recording film.

20 Claims, 7 Drawing Sheets

OPTICAL INFORMATION RECORDING MEDIUM AND MANUFACTURING METHOD THEREOF

CROSS REFERENCE TO RELATED APPLICATION

This application is based upon and claims the benefit of priority of Japanese Patent Application No.10-11485 filed Jan. 23, 1998, and No.10-163885 filed Jun. 11, 1998, the contents of which are incorporated herein by reference.

BACKGROUND OF THE INVENTION

1. Field of the Invention

The present invention relates to an optical information recording medium for recording information on a recording film by irradiating a recording laser beam and to a manufacturing method thereof. The optical information recording medium includes an optical disk, an optical card and the like.

2. Description of the Related Art

A one-time write CD (compact disk) which is compatible with a normal CD in reproducing information is now commercialized as an optical information recording medium. It is formed by providing an organic pigment recording film, an Au reflecting film and an UV (ultraviolet) resin protecting film on a transparent plastic substrate. Signals are recorded thereon by selectively lowering reflectance of a recording section, which is caused by deformation of the substrate due to thermal decomposition of the organic pigment recording film caused when the recording laser beam is irradiated.

However, the conventional one-time write CD has a problem that because the organic pigment is applied on the transparent substrate by a spin-coater, the film-forming conditions vary depending on the ambient temperature and humidity of the spin-coater, thus lowering the production yield.

With respect to this problem, Japanese Patent Publication (JP-B-) No. Hei. 3-57540 discloses a recording medium in which an energy absorbing recording film is formed on a substrate by means of sputtering. A film in which a low melting point metal such as Te and In is combined with an element such as N and 0 is used as the energy absorbing recording film. When a laser beam is irradiated onto the recording film, gas generates from the inside of the recording film by spot heating. As a result, the raising deformation of the recording film is caused by the generated gas so that signals are recorded on the recording film.

Although the production yield improves since sputtering is used in manufacturing the optical information recording medium, no reflecting film nor protecting film can be coated on the recording film and no single-plate disk such as a CD can be formed because the raising deformation of the recording film is used to record signals. It is not also suited to signal recording according to a recording mark length modulating method because the length of a recording mark becomes inaccurate when the deformation of the film occurs.

SUMMARY OF THE INVENTION

In view of the above-mentioned problems, it is an object of the present invention to provide an optical information recording medium which can be yielded well and on which signals can be recorded while causing almost no raising deformation therein.

In order to achieve the fore-going object, according to the present invention, a recording film is formed by means of vacuum film formation process. The recording film contains a substance which is thermally decomposed when a recording laser beam is irradiated thereto. When the thermal decomposition of the substance is caused by irradiation of the recording laser beam, a change in complex index of refraction is caused predominantly over the raising deformation in the recording film. As a result, information is recorded in the recording film.

The recording media can be yielded well since the recording film is formed by means of vacuum film formation process. As the vacuum film formation process, sputtering, evaporation and ion-plating methods can be used.

Because the recording film contains the substance which is thermally decomposed, when the recording laser beam is irradiated to the recording film, the thermal decomposition of the substance is caused. As a result, the substance generated by the thermal decomposition is precipitated within the recording film, and therefore the complex index of refraction of the recording film changes. At this time, the change in the complex index of refraction occurs predominantly over the raising deformation in the recording film. That is, information may be recorded in the recording film while causing almost no raising deformation thereof.

Compounds of metal and nitrogen such as Cu—N, Sn—N, Ag—N and Ni—N may be used as the thermally-decomposed substance. When such a compound is used, Cu, Sn, Ag or Ni produced due to the thermal decomposition of the compound is precipitated within the recording film when the recording laser beam is irradiated.

It is also preferable that the recording film contains a substance which disperses the substance produced by the thermal decomposition within the recording film. Such a substance may be an organic substance formed by using gas containing at least one of C, H, F, S, O, Cl, N, P, I and Br.

Further, when the recording film contains a substance for controlling light absorptivity, light reflected from the reflecting film may effectively pass through the recording film, and therefore the reflectance of the recording medium may be enhanced. In this case, the reflectance may be controlled readily by regulating an amount of the light absorptivity controlling substance to be mixed in.

When sputtering is used as the vacuum film formation process, the recording film may be formed by means of reactive sputtering which is carried out in a state that a raw material substance for forming the thermally-decomposed substance is used as a target, a raw material gas to be combined with the raw material substance to form the thermally-decomposed substance and a gas containing at least one of C, H, F, S, O, Cl, N, P, I and Br are introduced into a furnace.

Cu, Sn, Ag or Ni may be used as the raw material substance for forming the thermally-decomposed substance, and $N_2$ gas may be used as the raw material gas to be combined with the raw material substance to form the thermally-decomposed substance.

Further, the recording film can be formed while containing the substance for controlling the light absorptivity of the recording film, when reactive sputtering is carried out in a state that the raw material substance for forming the thermally-decomposed substance and the substance for controlling the light absorptivity are used as different targets.

Beside the single-layer single-sided disk in which the recording film, the reflecting film and the protecting film are formed on the substrate, the above-mentioned optical information recording medium may be a dual-layer single-sided disk in which recording films are provided on the both substrates and signals of the two films are read from one side or a dual-layer dual-sided disk in which substrates having two recording films are laminated and signals recorded in the films are read from both sides, in the dual-layered disks such as DVDs.

The specific nature of the invention, as well as other objects, uses and advantages thereof, will clearly appear from the following description and from the following drawings in which like numerals refer to like parts.

DESCRIPTION OF PREFERRED EMBODIMENTS

Figures 1, 1A:
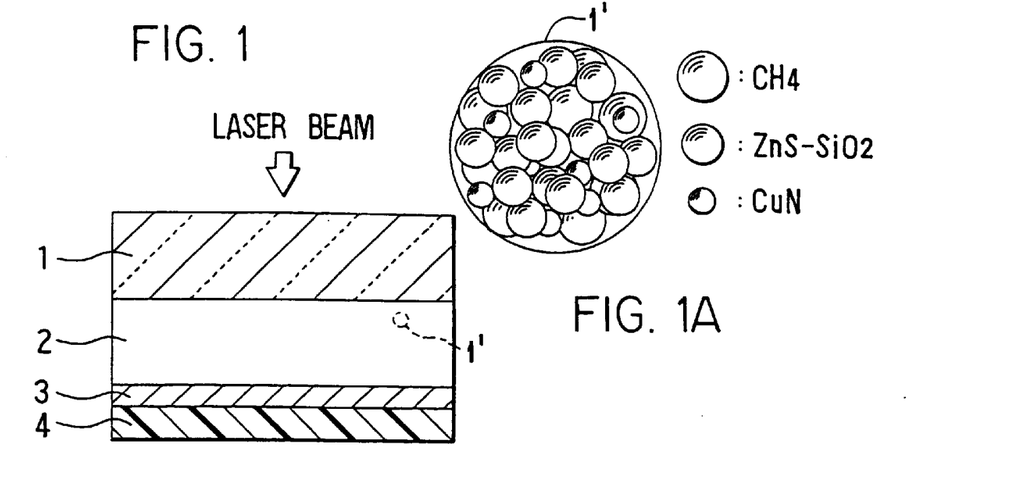
FIG. 1 is a schematic sectional view showing the structure of an optical information recording medium according to a first embodiment of the present invention.

Preferred embodiments of the present invention will be explained below in detail with reference to the drawings. As shown in FIG. 1, an optical information recording medium is formed by a recording film 2, a reflecting film 3 and a resin protecting film 4 formed on a transparent substrate 1 made from plastic, glass or the like. Although not shown in FIG. 1, guide grooves having wobbles are formed on the transparent substrate 1. The guide groove has a depth of 50 nm or less and a width of 0.5 $\mu$m to 0.7 $\mu$m for example.

The recording film 2 is formed by means of vacuum film formation process and contains a substance which is thermally decomposed when irradiated by a recording laser beam, a substance which disperses the substance generated by the thermal decomposition within the recording film 2 and a substance which is transparent with respect to the recording laser beam and regulates light absorptivity of the recording film 2.

Cu—N may be used as the substance which is thermally decomposed when irradiated by the recording laser beam. Beside that, Sn—N, Ag—N, Ni—N and the like may be used. An organic substance formed by using gas containing at least one of C, H, F, S, O, Cl, N, P, I and Br, e.g., one whose main component is $C_YH_X$ (Y=1 to 2, X=1 to 6) or more specifically $CH_4$ for example, may be used as the substance which disperses the substance generated by the thermal decomposition within the recording film 2. ZnS—$SiO_2$ may be used as the substance for regulating the light absorptivity of the recording film 2.

A metallic reflecting film, e.g., an Au, Ag or Al film or an alloy film thereof formed by means of sputtering or evaporation method may be used as the reflecting film 3. A light interference multi-layered reflecting film may be also used instead of the metallic reflecting film.

An UV hardening resin and the like may be used as the resin protecting film 4.

The one-time write optical disk which is arranged such that the reflectance of a recording section can drops for recording information can be constructed by forming the recording film 2, the reflecting film 3 and the resin protecting film 4 on the transparent substrate 1 as described above. Because the recording film 2 is formed by means of vacuum film formation process, a tact time can be shortened and the production yield can be improved.

It is noted that the recording film 2 may be formed by means of evaporation, ion plating or the like beside sputtering.

The optical information recording medium may be also structured by being laminated with a protecting plate or a substrate of the same kind as that shown in FIG. 1 by adhesive agent, UV resin or the like.

In dual-layer laminated disks such as DVDs, the optical information recording medium may be a dual-layer single-sided disk in which recording films are provided on both substrates and signals of the two films are read from one side or a dual-layer dual-sided disk in which substrates having dual-layer recording films are laminated to each other and signals recorded in the films are read from both sides.

Figure 2:
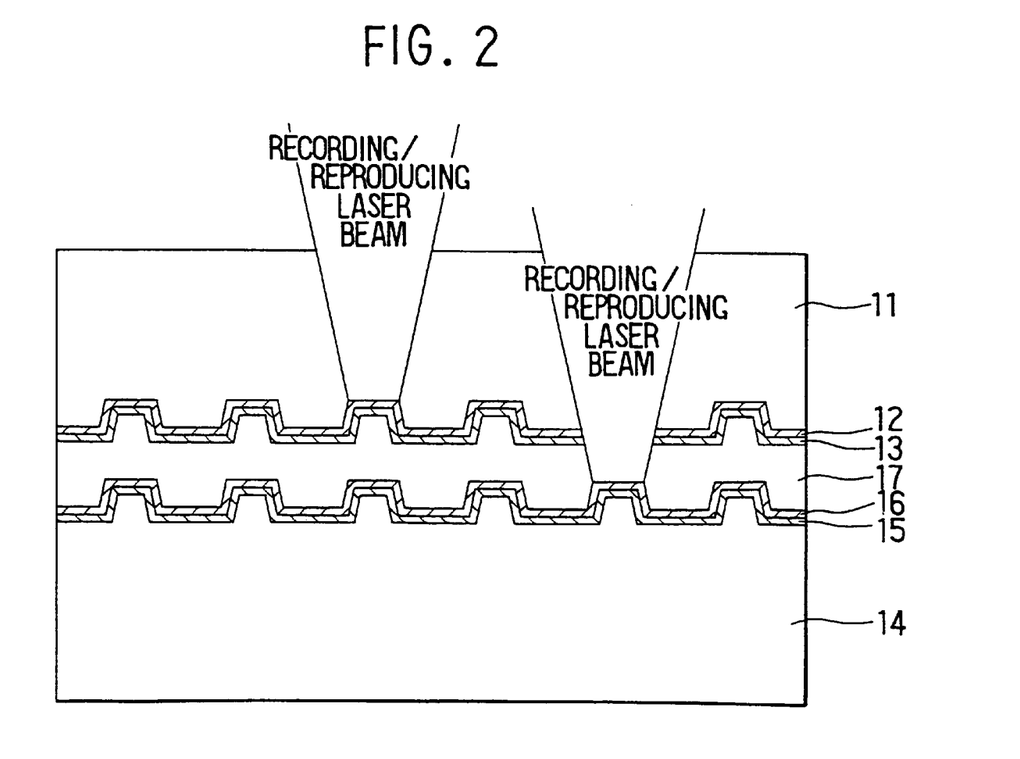
FIG. 2 is a diagram showing the structure of a dual-layer single-sided DVD.

FIG. 2 shows the structure of the dual-layer single-sided DVD. A semi-transparent recording film 12 and a reflecting film 13 are formed on a transparent substrate 11 having guide grooves, and a reflecting film 15 and a recording film 16 are formed on another transparent substrate 14 having guide grooves. Those two substrates 11 and 14 are laminated by an UV resin spacer 17. The thickness of the spacer 17 is 30 nm to 80 nm. Signals are recorded/reproduced by focusing a recording/reproducing laser beam onto either one of the recording films 12, 16.

Figure 3:
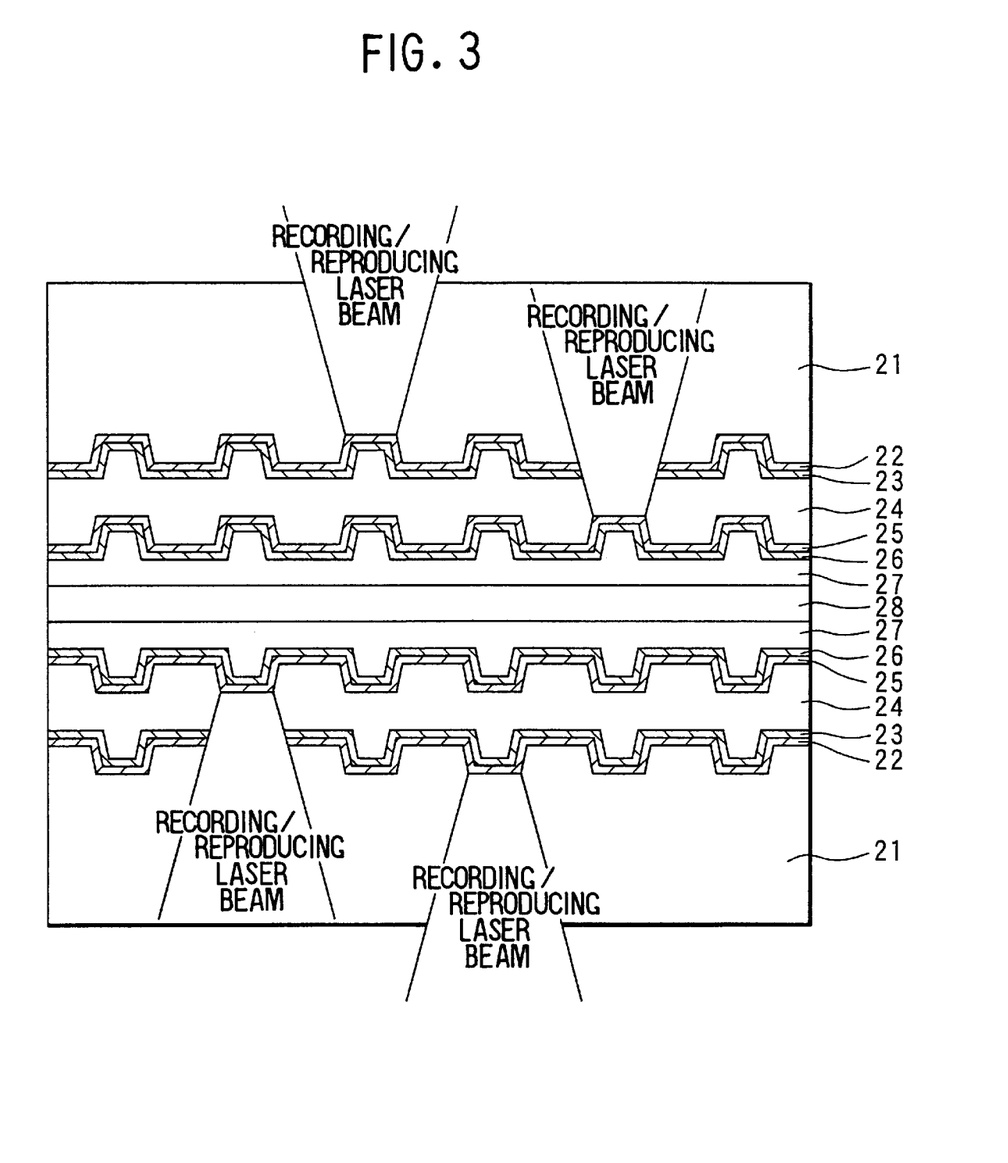
FIG. 3 is a diagram showing the structure of a dual-layer dual-sided DVD.

FIG. 3 shows the structure of the dual-layer dual-sided DVD. A semi-transparent recording film 22 and a reflecting film 23 are formed on a transparent substrate 21 having guide grooves and a spacer 24 having guide grooves is formed thereon by a 2P method. Then, a recording film 25, a reflecting film 26 and a protecting layer 27 are formed thereon. The dual-layer dual-sided disk is structured by pasting two disks having the above-described structure by an adhesive layer 28. The thickness of the spacer 24 is 30 nm to 80 nm. Signals are recorded/reproduced by focusing a recording/reproducing laser beam to the recording film of either one on the both sides.

The preferred embodiment of the optical information recording medium described above will be explained below in more detail.

[First Embodiment]

In FIG. 1, the recording film 2 was formed on the transparent polycarbonate substrate 1 having the guide grooves by sputtering a Cu target and a ZnS—$SiO_2$ target in the same time by means of reactive high-frequency sputtering (or reactive DC sputtering). At this time, gases of Ar, $N_2$ and $CH_4$ were introduced in the furnace. Sputtering power is 200 W for the Cu target and 400 W for the $ZnS$—$SiO_2$ target. The gaseous pressure is 12 Pa, and the ratio among the Ar, $N_2$ and $CH_4$ gases was 7:2:3. Further, an Au film of 100 nm is formed as the reflecting film 3. Finally, the UV hardening resin is applied on the reflecting film 3 by a spin-coater as the resin protecting film 4 and is hardened by irradiating the ultraviolet rays.

Complex index of refraction of the recording film 2 measured by a spectral ellipsometer is 0.03 to 2.0 (i) when the recording film is formed (asdepo time) and is 0.5 to 2.0 (i) after a heat treatment. It is noted that the complex index of refraction after the heat treatment represents the complex index of refraction of the recording film 2 onto which a recording laser beam is irradiated.

Figure 4:
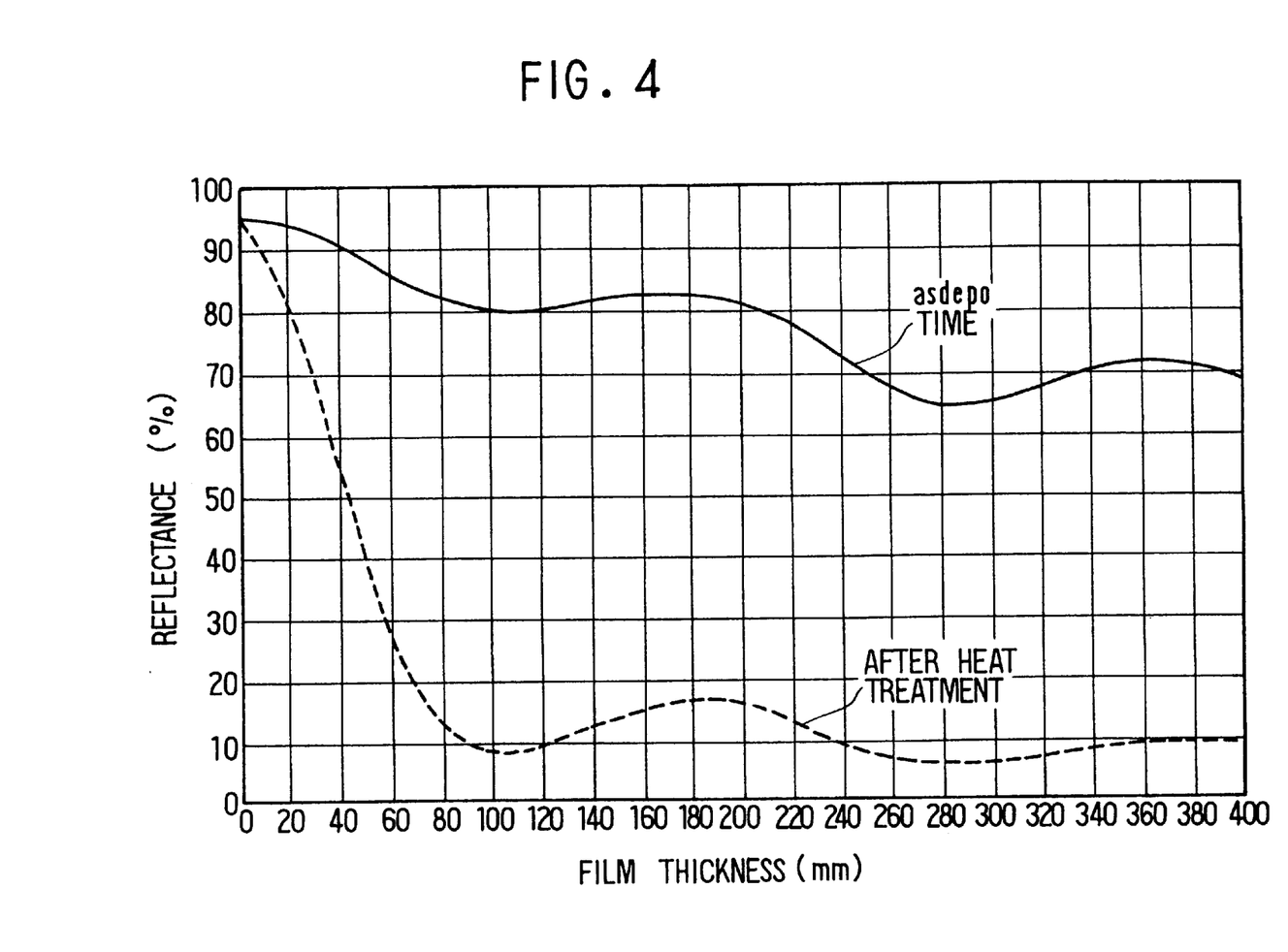
FIG. 4 is a graph showing the dependency of reflectance with respect to a film thickness on a mirror face on which no guide groove is formed in the first embodiment.

The dependency of reflectance with respect to a film thickness on a mirror face on which no guide groove is formed, is shown by the graph in FIG. 4.

Figure 5:
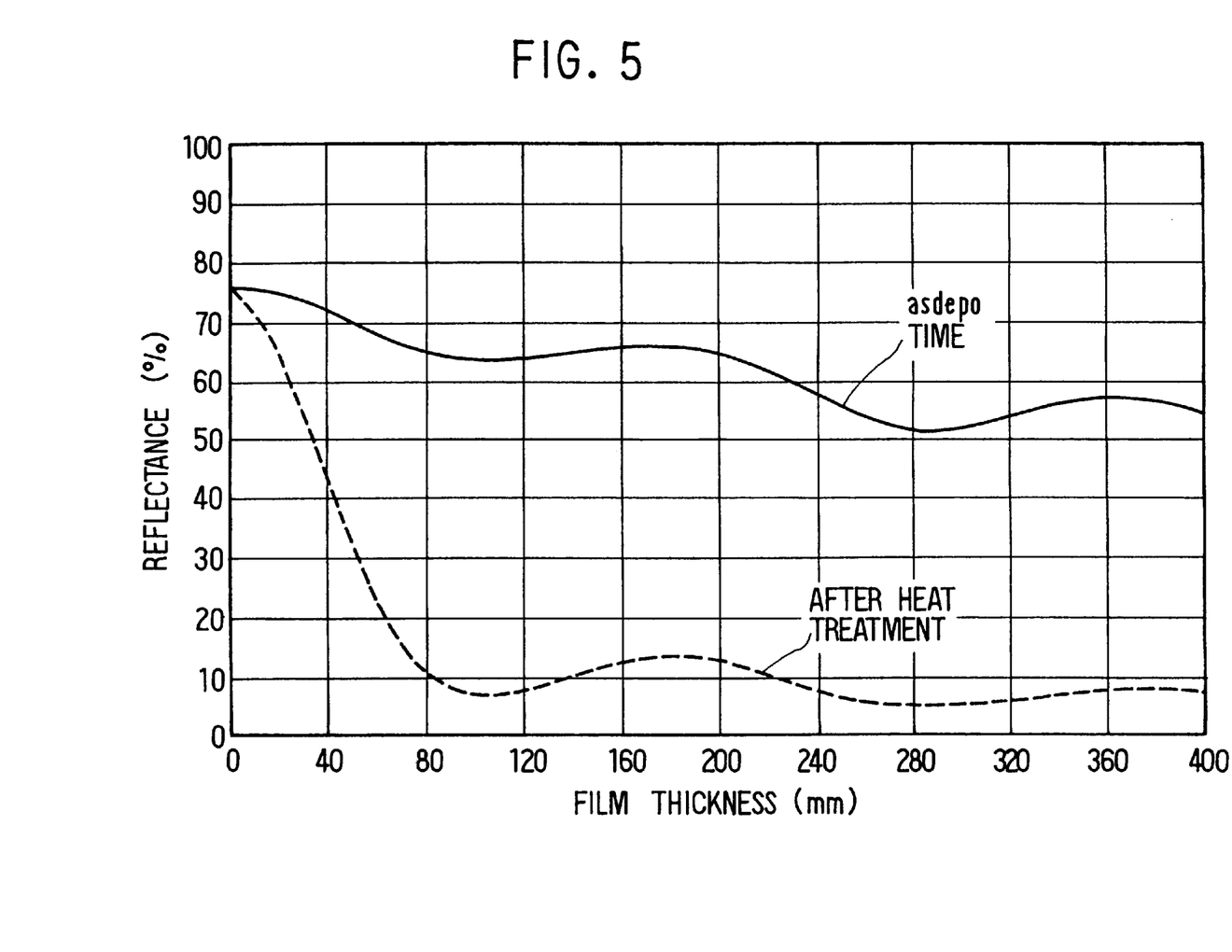
FIG. 5 is a graph showing the dependency of reflectance with respect to a film thickness on a guide groove in the first embodiment.

When the guide groove having a width of 0.7 $\mu$m and a depth of 40 nm is formed on the substrate 1, the dependency of reflectance on the film thickness on the guide groove is shown by the graph in FIG. 5. As seen from FIGS. 4 and 5, when the thickness is 170 nm, the reflectance of the mirror face is 83% and that on the guide groove is 66%. Accordingly, the optical information recording medium has the reflectance of 65% or more and the contrast which is equivalent to the amplitude modulation factor is about 80%, thus meeting the CD standard.

Signals were actually recorded on this optical disk. When EFM signals were recorded with a linear velocity of 2.8 m/s (double speed), it was possible to record with a laser power of 11 mW (780 nm). The amplitude modulation factor of I11 which is a signal having the longest pulse width among the EFM signals was 75%, thus meeting the CD standard which requires amplitude modulation factor of 60% or more and allowing to obtain good reproduction signals.

Figure 6:
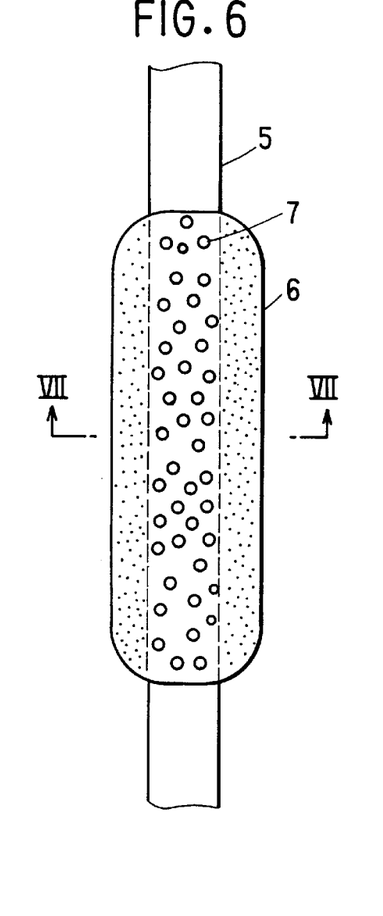
FIG. 6 is a plan view of a part where recording is executed by irradiating a recording laser beam in the first embodiment.
Figure 7:
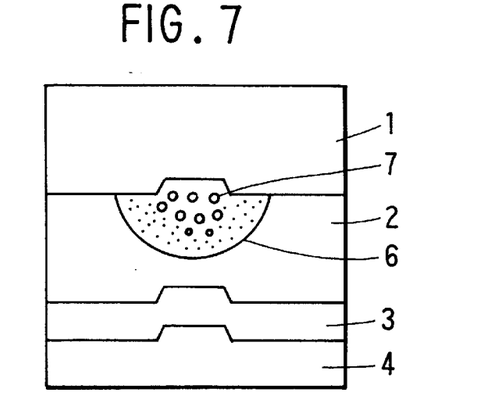
FIG. 7 is a section view taken along a line VII—VII in FIG. 6.

A part of the disk to which signals were recorded by irradiating the recording laser beam was studied by means of TEM observation. FIG. 6 shows a plane condition of that part and FIG. 7 shows a section view taken along a line VII—VII in FIG. 6. It is noted that the reference numeral 5 denotes a guide groove and the reference numeral 6 denotes a recording section.

In the first embodiment, Cu—N, $CH_4$ and $ZnS$—$SiO_2$ are contained in the recording film 2. When the recording laser beam is irradiated, Cu—N is thermally decomposed by the irradiation energy and Cu precipitates into the recording film 2 (the reference numeral 7 denotes the precipitated Cu). Because the precipitated Cu 7 disperses within the recording film 2 and absorbs light, the optical constant of the recording film 2, i.e., the complex index of refraction, changes. In this case, $CH_4$ plays a role of dispersing the precipitated Cu 7 within the recording film 2. Further, because the irradiation energy is the highest at the center of the guide groove 5, the amount of the precipitated Cu 7 is large at the center and is small at the periphery of the guide groove 5.

Figure 8:
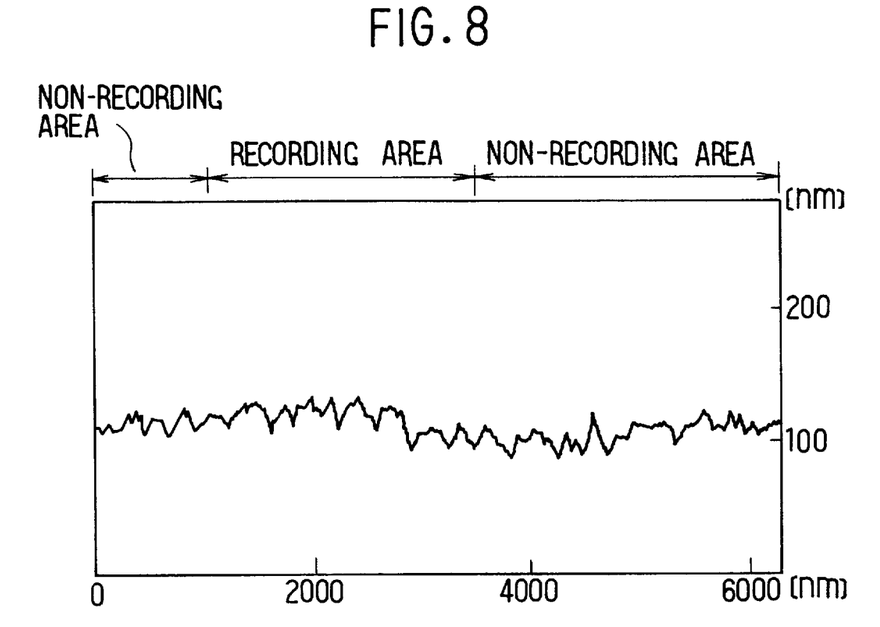
FIG. 8 is a graph showing the surface state of a recording film measured by an AFM (Atomic Force Microscope) along the guide groove in the first embodiment.

FIG. 8 shows the surface condition of the recording film 2 measured by an AFM (Atomic Force Microscope) along the guide groove 5. The horizontal axis represents a distance in the groove direction from a predetermined position in the guide groove 5 and the vertical axis represents the surface position (height) of the recording film 2. It is noted that the surface position of the recording film 2 changes irregularly due to the surface roughness of the substrate 1. As it is apparent from the graph in FIG. 8, the recording film 2 is scarcely deformed in the recording area as compared to the non-recording area, and the average difference of level (height) is about 20 nm at most.

Figure 9:
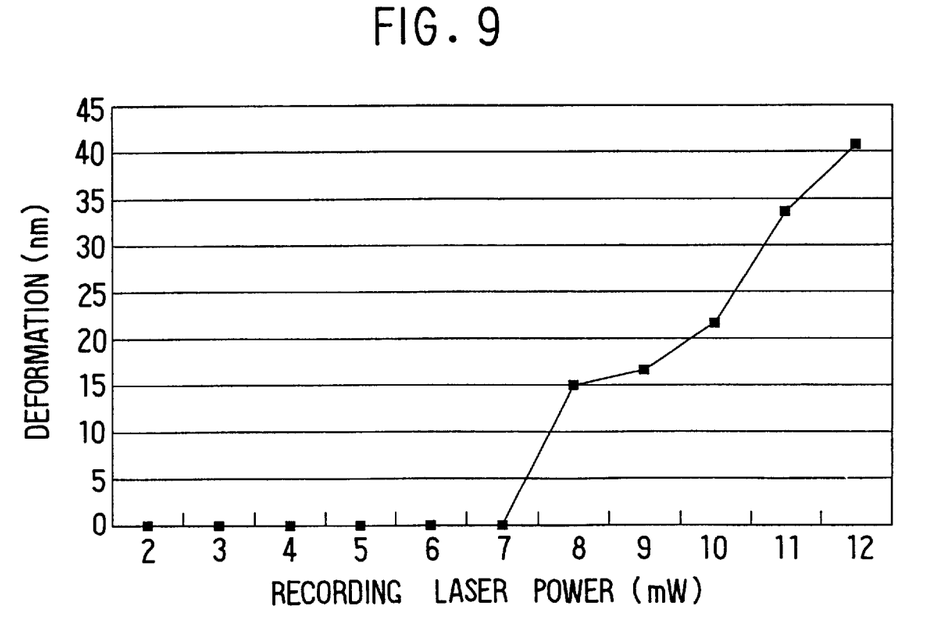
FIG. 9 is a graph showing the dependency of the surface deformation of the recording film with respect to the recording laser power measured by the AFM along the guide groove in the first embodiment.
Figure 10:
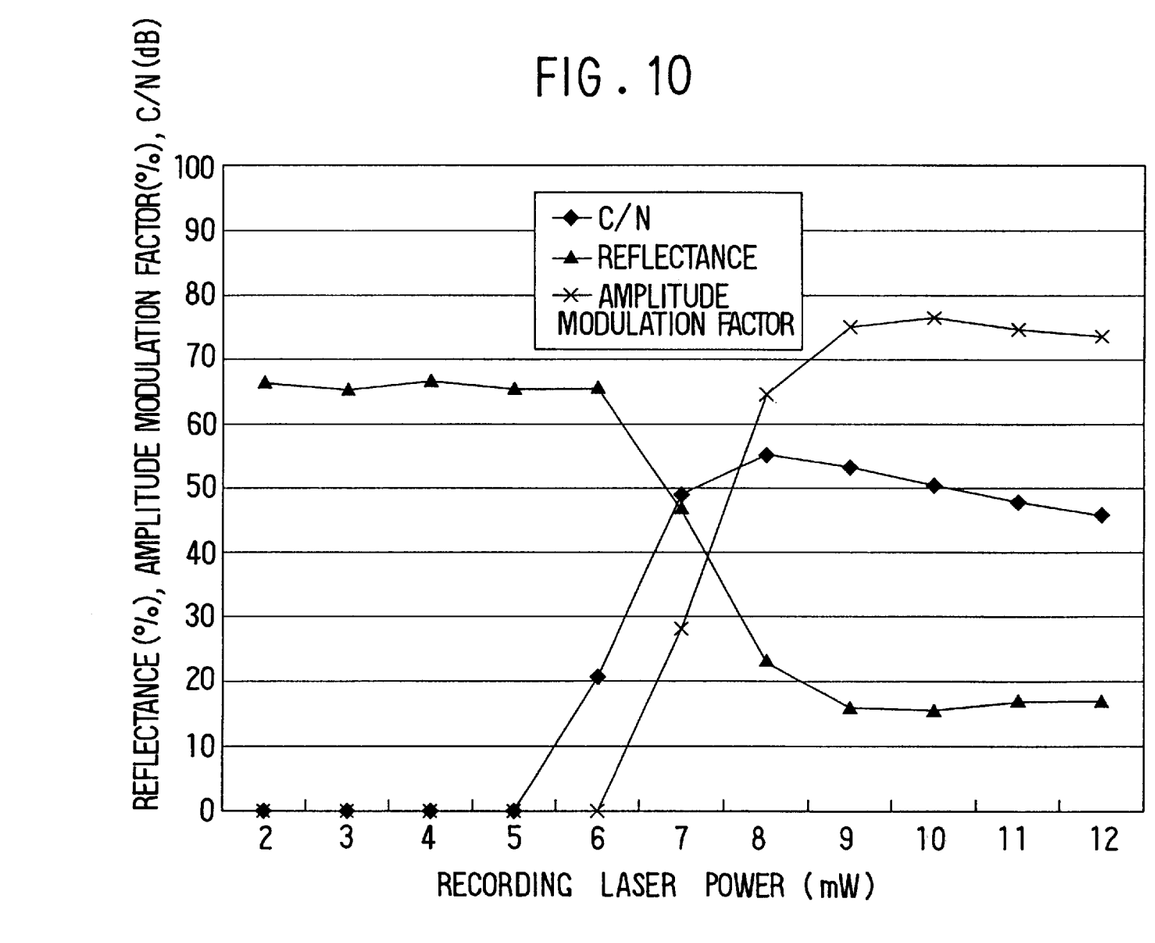
FIG. 10 is a graph showing the dependency of reflectance, amplitude modulation factor and a ratio of carrier signal to noise (C/N) with respect to the recording laser power in the first embodiment.

FIG. 9 shows the dependency of the surface deformation of the recording film 2 with respect to the recording laser power measured by the AFM along the guide groove 5. The horizontal axis represents the recording laser power and the vertical axis represents the deformation of the recording film 2. FIG. 10 shows the measured results of the dependency of the reflectance, the amplitude modulation factor and the ratio of carrier signal to noise (C/N) with respect to the recording laser power. As it is apparent from FIGS. 9 and 10, the deformation of the recording film 2 is 15 nm when the recording laser power is 8 mW where the ratio C/N is the highest.

Accordingly, it can be said that the raising deformation scarcely occurs in the recording film 2 when the recording laser beam is irradiated in the recording medium of the first embodiment.

That is, information is recorded by the thermal decomposition of Cu—N which is caused by irradiation of the recording laser beam. At this time, the change in the complex index of refraction occurs predominantly over the raising deformation in the recording medium of the first embodiment. It is noted that when the raising deformation occurring in the recording film 2 caused by irradiation of the recording laser beam is 50 nm or less, it is considered that the change in the complex index of refraction occurs predominantly over the raising deformation.

The optical information recording medium of the present invention may be also formed by the methods shown in second and third embodiments described below, beside the method shown in the first embodiment described above.

[Second Embodiment]

The recording film 2 is formed by sputtering an alloy target in which Cu and Sn are alloyed with a ratio of 40:60 in atomic % on the transparent polycarbonate substrate 1 having the guide grooves by the reactive high-frequency sputtering method. At this time, gases of Ar, $N_2$ and $CH_4$ are introduced in the furnace. Sputtering power is 500 W, a gaseous pressure is 12 Pa, and the ratio among the gases Ar, $N_2$ and $CH_4$ is 6:3:3. Further, the Au film of 100 nm is formed as the reflecting film 3. Finally, the UV hardening resin is applied on the reflecting film 3 as the resin protecting film 4 by a spin-coater and is hardened by irradiating the ultraviolet rays.

The complex index of refraction of the recording film measured was 0.07 to 2.6 (i). Further, when the film thickness was 125 nm, reflectance of the mirror face was 78% and that of the guide groove was 73%. Accordingly, the recording medium has reflectance of 60% or more, thus meeting the CD standard.

Signals were actually recorded on this optical disk. When EFM signals were recorded with a linear velocity of 2.8 m/s (double speed), they could be recorded with a laser power of 9 mW (780 nm). The amplitude modulation factor of I11 which is a signal having the longest pulse width among the EFM signals was 74%, thus meeting the CD standard requiring the amplitude modulation factor of 60% or more. Thus, the good reproduction signal could be obtained.

[Third Embodiment]

The recording film 2 is formed by RF-sputtering an Ag target and a $ZnS$—$SiO_2$ target in the same time on the transparent polycarbonate substrate 1 having the guide grooves by means of reactive high-frequency sputtering. At this time, gases of Ar, $N_2$ and $CH_4$ are introduced in the furnace. Sputtering power for the Ag target is 100 W and that for the $ZnS$—$SiO_2$ target is 500 W. Further, a gaseous pressure is 12 Pa and the ratio among the gases Ar, $N_2$ and $CH_4$ is 1:1:1. At this time, Ag—N is formed in the recording film 2 by the reaction. Further, the Au film of 100 nm is formed as the reflecting film 3. Finally, the UV hardening resin is applied as the resin protecting film 4 by a spin-coater and then is hardened by irradiating the ultraviolet rays.

The complex index of refraction of the recording film 2 measured at this time was 0.05 to 2.5 (i). Further, when the film thickness was 130 nm, the reflectance of the mirror face was 81% and that on the guide groove was 76%. Accordingly, the recording medium of the third embodiment has the reflectance of 60% or more, thus meeting the CD standard.

Signals were actually recorded on this optical disk. When EFM signals were recorded with a linear velocity of 2.8 m/s (double speed), they could be recorded with a laser power of 9 mW (780 nm). The amplitude modulation factor of I11 was 66% and good reproduction signals meeting the CD standard could be obtained.

Cu—N, Sn—N, Ag—N and Ni—N have been shown as the substances which are thermally decomposed when irradiated by the recording laser beam in the first through third embodiments. In detail, Cu—N is thermally decomposed at 300° C., Sn—N is thermally decomposed at 360° C., Ag—N is thermally decomposed at 165° C. and Ni—N is thermally decomposed at 300° C. Accordingly, Cu—N, Sn—N, Ag—N and Ni—N is fully thermally-decomposed by the normal recording laser beam. In contrary to that, because the compound of Te, In and nitrogen described in the column of the prior art is not thermally decomposed at the temperature of the normal recording laser beam, the change of the complex index of refraction due to thermal decomposition scarcely occurs in the recording film of the conventional recording medium.

[Fourth Embodiment]

As shown in FIG. 2, the semi-transparent recording film 12 of 110 nm is formed by the same method as the first embodiment on the transparent substrate 11 of 0.6 mm in thickness having the guide grooves, and the semi-transparent reflecting film 13 made of Si—C and having a thickness of 60 nm is formed thereon. The transmittance of the device is 60% at this time. An Au film of 80 nm is formed as the reflecting film 15 on another transparent substrate 14 of 0.6 mm in thickness having the guide grooves, and a recording film 16 of 110 nm is formed thereon by the same method as the first embodiment. Those two substrates 11 and 14 are laminated by a liquid UV resin. Then, the UV resin is spun off by the spinner and the thickness of the spacer 17 is set at 55 μm. Next, the UV rays are irradiated to harden the UV resin. Reflectance of the recording film 12 at this time is 24% and reflectance of the recording film 16 through the substrate 11 is 23%.

When DVD signals were actually recorded by means of laser of wavelength 635 nm with a linear velocity of 3.84 m/s, the signals could be recorded on the recording film 12 by a laser power of 9 mW and the jitters at this time were 7 ns. Similarly to that, the recording power for the recording film 16 was 8 mW and the jitters at this time was 8 ns.

[Fifth Embodiment]

As shown in FIG. 3, the semi-transparent recording film 22 of 110 nm is formed by the same method as the first embodiment on the transparent substrate 21 of 0.6 mm in thickness having the guide grooves, and the Si—C semi-transparent reflecting film 23 of 60 nm is formed thereon. The transmittance of the device is 60% at this time. The UV resin is applied on this semi-transparent reflecting film 23, a stamper having guide grooves is pressed against it and the thickness of the spacer 24 is set at 55 nm by turning a spinner. Next, the spacer 24 is hardened by irradiating the UV rays and then the spacer 24 is peeled off. Then, the recording film 25 of 110 nm is formed by the same method as the first embodiment. An Au film of 80 nm is then formed on the recording film 25 as the reflecting film 26, and the protecting layer 27 is formed further. Then, two substrates formed as described above are laminated by a liquid UV resin, the UV resin is spun off by the spinner and the UV rays is irradiated to harden the resin. Reflectance of the recording film 22 at this time is 24% and reflectance of the recording film 25 through the substrate 21 is 23%.

When DVD signals were actually recorded by a laser beam of a wavelength 635 nm with a linear velocity of 3.84 m/s, the signals could be recorded on the recording film 22 by a laser power of 9 mW and the jitters at this time were 7 ns. Similarly to that, the recording power for the recording film 25 was 8 mW and the jitters at this time were 8 ns.

While the preferred embodiments have been described, variations thereto will occur to those skilled in the art within the scope of the present inventive concepts which are delineated by the following claims.

What is claimed is:

1. An optical information recording medium comprising:
   a transparent substrate;
   a recording film formed on said transparent substrate, for recording information therein by irradiation of a recording laser beam; and
   a reflecting film formed on said recording film,
   wherein said recording film contains a first substance which is thermally decomposed when said recording laser beam is irradiated thereto, and a change in complex index of refraction is caused by the thermally-decomposed substance predominantly over raising deformation in said recording film, and
   said recording film further includes a second substance which disperses a third substance produced by thermal decomposition within said recording film.

2. An optical information recording medium according to claim 1, wherein said first substance is a compound of metal and nitrogen.

3. An optical information recording medium according to claim 1, wherein said second substance is an organic substance.

4. An optical information recording medium according to claim 1, wherein said recording film further includes a fourth substance for controlling light absorptivity thereof.

5. The optical information recording medium according to claim 4, wherein said fourth substance adjusts said light absorptivity of said recording film to control said complex index of refraction from said reflecting film.

6. An optical information recording medium, comprising:
   a transparent substrate;
   a recording film formed on said transparent substrate, for recording information therein by irradiation of a recording laser beam; and
   a reflecting film formed on said recording film,
   wherein said recording film contains a first substance which is thermally decomposed when said recording laser beam is irradiated thereto, and a change in complex index of refraction is caused by the thermally-decomposed substance predominantly over raising deformation in said recording film,
   wherein said recording film further includes a substance for controlling light absorptivity thereof,
   wherein said substance is ZnS—$SiO_2$.

7. A manufacturing method of an optical information recording medium, the method comprising the steps of:

preparing a transparent substrate;

forming a recording film by reactive sputtering which is carried out in a state that a raw material substance for forming a thermally-decomposed substance is used as a target, a raw material gas to be combined with said raw material substance to form said thermally-decomposed substance and a gas containing at least one of C, H, F, S, O, Cl, N, P, I and Br are introduced into a furnace; and forming a reflecting film on said recording film, wherein said recording film contains said thermally-decomposed substance, and a change in complex index of refraction is caused by the thermally-decomposed substance in response to irradiation of a recording laser beam predominantly over raising deformation in said recording film.

8. A manufacturing method according to claim 7, wherein said reactive sputtering is carried out in a state that said raw material substance for forming said thermally-decomposed substance and another substance for controlling light absorptivity of said recording film are used as different targets.

9. A manufacturing method of an optical information recording medium, the method comprising the steps of:

preparing a transparent substrate;

forming a recording film by a vacuum film formation process in such a manner that said recording film includes a first substance which is thermally decomposed when a recording laser beam is irradiated thereto, and a change in complex index of refraction is caused predominantly over raising deformation by the thermally-decomposed substance in said recording film; and forming a reflecting film on said recording film.

10. A manufacturing method according to claim 9, wherein said vacuum film formation process is one of sputtering, evaporation and ion-plating methods.

11. A manufacturing method according to claim 10, wherein when sputtering method is adopted as said film formation method, said recording film is formed by sputtering which is carried out in a state that a raw material substance for forming said first substance is used as a target, a raw material gas to be combined with said raw material substance to form said first substance is introduced into a furnace.

12. A manufacturing method according to claim 11, wherein said sputtering is carried out in a state that a gas containing at least one of C, H, F, S, O, Cl, N, P, I and Br is further introduced into said furnace, whereby said recording film contains a second substance for disperses a third substance produced by thermal decomposition within said recording film.

13. A manufacturing method according to claim 11, wherein said sputtering is carried out in a state that said raw material substance for forming said thermally-decomposed substance and another substance for controlling light absorptivity of said recording film are used as different targets.

14. A method of manufacturing an optical information recording medium, the method comprising:

preparing a transparent substrate;

forming a recording film by reactive sputtering which is carried out in a state that a raw material substance for forming a thermally-decomposed substance is used as a target, a raw material gas to be combined with said raw material substance to form said thermally-decomposed substance and a gas containing at least one of C, H, F, S, O, Cl, N, P, I and Br are introduced into a furnace; and forming a reflecting film on said recording film, wherein said recording film contains said thermally-decomposed substance, and a second substance which disperses a third substance produced by thermal decomposition within said recording film, and a change in complex index of refraction is caused by the thermally-decomposed substance in response to irradiation of a recording laser beam predominantly over raising deformation in said recording film.

15. The method of manufacturing according to claim 14, wherein said reactive sputtering is carried out in a state that said raw material substance for forming said thermally-decomposed substance and another substance for controlling light absorptivity of said recording film are used as different targets.

16. A method of manufacturing an optical information recording medium, the method comprising:

preparing a transparent substrate;

forming a recording film by a vacuum film formation process in such a manner that said recording film includes a first substance which is thermally decomposed when a recording laser beam is irradiated thereto and a second substance which disperses a third substance produced by thermal decomposition within said recording film, and a change in complex index of refraction is caused predominantly over raising deformation by the thermally-decomposed substance in said recording film; and forming a reflecting film on said recording film.

17. The method of manufacturing according to claim 16, wherein said vacuum film formation process is one of sputtering evaporation and ion-plating methods.

18. The method of manufacturing according to claim 17, wherein when sputtering method is adopted as said film formation method, said recording film is formed by sputtering which is carried out in a state that a raw material substance for forming said first substance is used as a target, a raw material gas to be combined with said raw material substance to form said first substance is introduced into a furnace.

19. The method of manufacturing according to claim 18, wherein said sputtering is carried out in a state that a gas containing at least one of C, H, F, S, O, Cl, N, P, I and Br is further introduced into said furnace, whereby said recording film contains a second substance for disperses a third substance produced by thermal decomposition within said recording film.

20. A method of manufacturing according to claim 18, wherein said sputtering is carried out in a state that said raw material substance for forming said thermally-decomposed substance and another substance for controlling light absorptivity of said recording film are used as different targets.

* * * * *